United States Patent [19]
McNally et al.

[11] 3,836,132
[45] Sept. 17, 1974

[54] SELF-LEVELING COMBINED SHOCK ABSORBER AND FLUID SPRING ASSIST UNIT

[75] Inventors: Sellers B. McNally, Homewood; Charles D. Lemme, Park Forest, both of Ill.

[73] Assignee: Maremont Corporation, Chicago, Ill.

[22] Filed: June 26, 1972

[21] Appl. No.: 266,374

Related U.S. Application Data

[63] Continuation-in-part of Ser. No. 163,983, July 19, 1971.

[52] U.S. Cl. .............................................. 267/64 R
[51] Int. Cl. ............................................. B60g 4/26
[58] Field of Search .................................. 267/64 R

[56] References Cited
UNITED STATES PATENTS

| | | | |
|---|---|---|---|
| 3,593,978 | 7/1971 | Lohr | 267/64 R |
| 3,729,184 | 4/1973 | Allinquant et al. | 267/64 R |

*Primary Examiner*—James B. Marbert
*Attorney, Agent, or Firm*—Cushman, Darby & Cushman

[57] ABSTRACT

A self-leveling combined shock absorber and liquid spring unit adapted to be mounted in place of a conventional shock absorber between the sprung and unsprung masses of a vehicle having a conventional suspension system made up of a pair of upper and lower tubular structures mounted for longitudinal movement with respect to each other in contracting and extending telescopic relation, the tubular structures providing a cylinder, piston and piston rod arrangement defining separate rebound and compression damping chambers filled with hydraulic fluid and supplied from an annular supply chamber concentric with the cylinder, the interior of the piston rod member defines with a separate elongated displacement member a variable volume load bearing liquid spring chamber, the displacement member serving additionally as part of a pump-up mechanism for positively displacing hydraulic fluid from a supply damping chamber into the load bearing liquid spring chamber and as a part of a separate pump-down mechanism for positively displacing liquid from the load bearing liquid spring chamber into a damping chamber, the operative strokes and displacements of the two pump mechanisms being different but interrelated so as to maintain a variable amount of hydraulic fluid within the load bearing liquid spring chamber sufficient to provide a load bearing force when the tubular structures are in a generally centrally located predetermined relative telescopic position, which varies substantially in accordance with the static load carried by the unsprung mass of the vehicle, the arrangement being such that positive damping is provided at no-load capability and abrupt changes in the spring force are avoided during the telescopic movements of the tubular structures through the predetermined central position.

32 Claims, 4 Drawing Figures

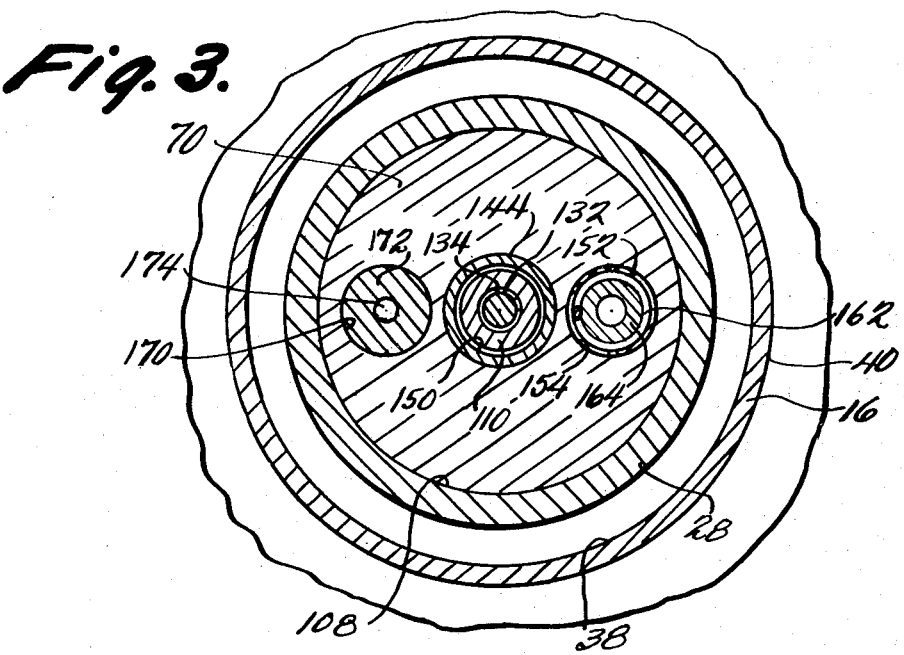
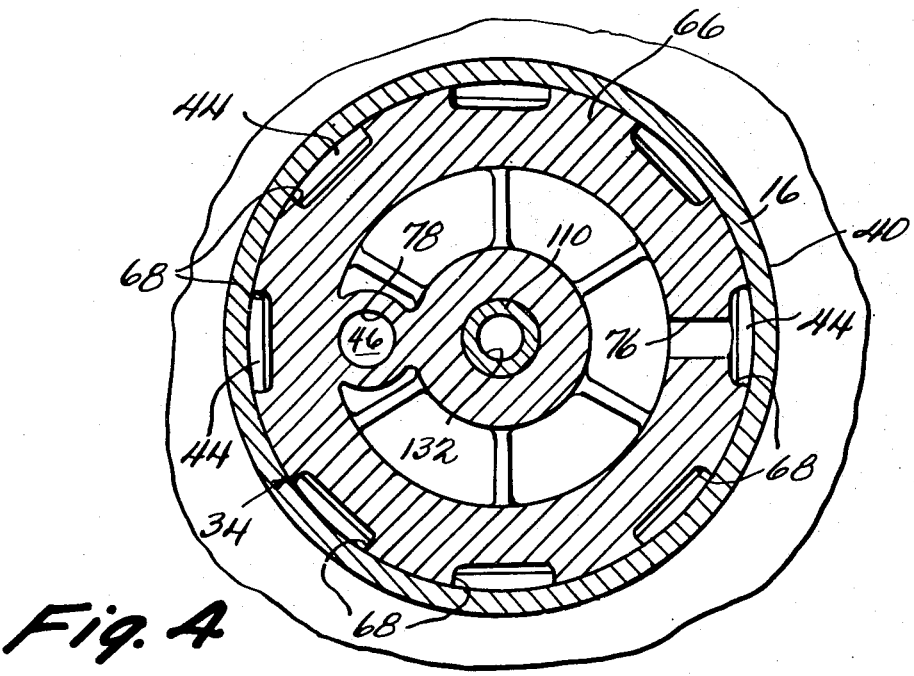

SELF-LEVELING COMBINED SHOCK ABSORBER AND FLUID SPRING ASSIST UNIT

This application is a continuation-in-part of application Ser. No. 163,983, filed July 19, 1971.

This invention relates to combined shock absorber and fluid spring units and more particularly to units of this type which are particularly adapted to function as assist units to be installed in place of existing conventional shock absorbers and which, when installed, function to maintain the vehicle at a substantially constant mean operating level throughout a wide range of static load changes.

The conventional steel spring suspension systems utilized in most automotive passenger vehicles provide quite satisfactory ride characteristics under most conditions. It has long been recognized, however, that where passenger vehicles are loaded excessively as, for example when the rear trunk compartment is filled with heavy articles, trailer vehicles are supported and pulled from the rear bumper and the like, the rear end of the vehicle tends to ride too low, resulting in excessive bottoming out of the suspension system. Moreover, such heavy static loading causes the vehicle to assume an uneven riding position which can cause hazard, particularly at night when the headlights are directed upwardly into the eyes of on-coming motorists.

This situation exists because of the inherent characteristics of conventional steel spring suspension systems. Most conventional steel spring suspension systems provide a total stroke or range of relative movement between the sprung and unsprung mass of about 10''. The relative position of the sprung mass with respect to the unsprung mass can be conveniently expressed in terms of this total stroke by two numbers, the first of which states the amount of relative movement which can take place within the total stroke in a direction of the movement of the masses together and the second of which states the amount of movement which can take place within the total stroke in a direction where the masses move relatively apart. A characteristic of conventional steel spring suspension systems is that for any given position, the suspension system supports the sprung mass with a predetermined spring force, which spring force increases as the position is changed from 10–0 to 0–10. The value of the spring force variation throughout the range of movement must be chosen with two considerations in mind. First, the desired position at which the sprung mass is maintained under variations in static loads and two, the range of movement which will occur as a result of dynamic operation for any given static load.

In general, it can be stated that because conventional steel spring suspension systems provide a predetermined variation in the spring force, optimum dynamic operation throughout the entire range of static load conditions encountered simply cannot be obtained. The value of the spring force variation is chosen so as to give optimum dynamic operation under a range of static load conditions which are most frequently encountered. These static load conditions include minimum load, as for example, simply a driver load and fuel load, and a heavy load less than maximum which would include normal passenger load and/or normal trunk load. The variation in the static load position of the sprung mass typically is from a 6–4 position at a minimum load to a 4–6 position at heavy load. Excessive loads, as for example, bumper loads by connection of trailers or the like, may well bring the sprung mass of the vehicle to a position below 4–6 where the aforementioned bottoming out and upwardly-directed headlights occur.

In order to alleviate these problems which occur at the generally less frequently encountered excessive loads, load bearing assist units are commercially available. Typically, such assist units include a coil spring combined with a conventional shock absorber whose damping characteristics are modified to accommodate the combined variable spring force of the conventional suspension system plus the coil spring of the assist unit. These assist units are mounted on the vehicle in place of the conventional rear shock absorbers thereof.

Under excessive static load conditions the assist unit serves to maintain the sprung mass at a position above that provided by the conventional system (as for example above a 4–6 position) so that bottoming out and upwardly-directed headlights will be avoided under these extreme circumstances. On the other hand, most commercially available coil spring assist units of this type utilize a coil spring which is stressed when the unit is at maximum extension so that under minimum load conditions (which most likely will be encountered more frequently than excessive load conditions) the sprung mass will be maintained at a position above that of the conventional suspension system (as for example, at 6-¾–3-¼ position). Thus, while coil spring assist units serve to alleviate the problems of excessive load, the performance of the vehicle at minimum load conditions is detrimentally affected.

In addition to coil spring assist units, air spring assist units are also commercially available and have received considerable acceptance. These units include a conventional shock absorber with modified damping characteristics and an air spring provided by a folded rolling seal between the outer tubular member of the shock absorber and a tubular member carried by the outer end of the piston rod. The advantage of air spring assist units is that the spring force at any position of the unit can be varied by varying the air pressure within the air spring. Under excessive load conditions, an air spring assist unit can be made operable to support the sprung mass at a position considerably above that provided by the conventional suspension system (as for example, at a 5—5 position). This capability is particularly useful where the vehicle operator contemplates frequent excessive loads as, for example, where the vehicle is used to pull a boat trailer or other trailer during the weekends. Under these circumstances, the air spring can be charged with air during the weekend trip so that the vehicle will ride at a highly desirable level. When the excessive load condition is removed, the sprung mass will be moved to a relatively high position. However, by releasing some of the pressure within the air spring, a lower operating position under minimum static load can be obtained.

However, all of the known and commercially available air spring assist units have operating characteristics which require the maintenance of a minimum air pressure within the spring at all times, including when the unit is at a maximum extension. This operating characteristic, like the comparable operating characteristic of coil spring units, means that the vehicle must be maintained at a level under minimum load conditions above that of the conventional suspension system (as for example at a 6-¾–3¼ position). Air spring assist units thus suffer from the same disadvantages as coil spring assist units in this regard. Moreover, the variable spring force advantages of air spring assist units over coil spring assist units are not obtained without some inconvenience. Because of the position of the units on the vehicle, the air pressure cannot be changed conveniently by direct operation. Typically, air lines must be provided which extend from the units to a more conveniently accessible location on the vehicle and the provision of such air lines creates operational problems.

It has long been recognized that these inconveniences of a combined shock absorber and air spring assist unit can be obviated by providing a combined shock absorber and fluid spring assist unit which has built into it the capability of adjusting the spring force automatically in response to changes in the static load conditions. Selfcontained, self-leveling combined shock absorber and fluid spring units of this type have been proposed in the patented literature for over 50 years. Within the last 12 years, well over 40 patents have issued disclosing proposed units of this type. Despite the market which exists for a unit of this type capable of use as an assist unit, no commercial assist unit of this type is presently available.

The units of this type which have been marketed, as well as most of the proposed units of the patented literature, are adapted to function as primary suspension units and because of the peculiar size requirements and operational requirements of assist units, are unsuitable for that purpose. With respect to size requirements, it will be understood that where the unit is to serve as a primary suspension unit it can be mounted within the space normally occupied by both the spring and the shock absorber, whereas when the unit is to be used as an assist unit, it replaces only the shock absorber and hence must be packaged within a much smaller size to avoid interference with the conventional springs of the vehicle and its mount.

With respect to operating requirements, a basic difference exists in that a primary suspension unit is designed to support its proportionate share of the sprung mass plus any static load added thereto, whereas an assist unit is essentially designed to support only added static load, the sprung mass being supported by the conventional suspension system. The peculiar significance of this difference as applied to self-leveling units can be best be appreciated by considering the use of a typical unit first under a primary suspension mode and then under an assist mode. For illustrative purposes, consider that the unit is set to level at a 5—5 position, which means that whenever the change in static load causes operation at a level above 5—5, the unit will operate to effect a net movement of fluid out of the load bearing spring chamber, and at a level below 5—5, the unit will operate to effect a new movement of fluid into the load bearing spring chamber. Under a primary suspension mode, this movement of fluid into and out of the load bearing spring chamber will vary the pressure therein between a minimum equal to that necessary to support the unit's proportionate share of the sprung mass to a maximum equal to that necessary to support the unit's proportionate share of the sprung mass plus the maximum added static load. Since the unit, under a primary suspension mode, is at all times loaded by the sprung mass even without any added static load, the load bearing spring chamber remains pressurized at all times and the difference between maximum and minimum pressure is relatively small in comparison with the minimum pressure.

When the same unit is used in an assist mode, the conventional suspension system provided materially alters the load carried by the unit and hence the load bearing spring pressures of the unit. These changes, in turn, have a material effect upon the leveling position of the unit. Thus, where the conventional suspension system would normally support the sprung mass plus a minimum static load at a 6–4 position, it would be necessary for a unit set to level at a 5—5 position to actually pull the sprung mass down against the action of the conventional suspension system. Such an action would require the establishment of a negative pressure in the load bearing spring chamber. The alternatives to an action of this type is to set the leveling position of the unit above the position at which the sprung mass is supported at minimum static load (e.g. 6¾ –3¼) so that the unit is loaded (and hence pressurized) at all times or to make the unit essentially inoperable until sufficient static load is added to move ths sprung mass down to the 5—5 level. The first alternative prevents leveling at the most desirable level and the second alternative requires operation at pressures which are at least atmospheric if not negative. Thus, in order for a self-leveling unit to level at an optimum level, when used in an assist mode, it must be capable of operating with the load bearing spring chamber at atmospheric pressure and preferably below. Many of the prior art units disclosed for use in a primary suspension mode do not provide this capability and hence are not completely suitable for use in an assist mode.

Accordingly, it is an object of the present invention to provide a self-contained, self-leveling combined shock absorber and fluid spring assist unit which meets the above-mentioned size or packaging requirements and is capable of effective operation throughout an extensive range of static load conditions from minimum to excessive, including operation at no-load under minimum static load conditions. In accordance with the principles of the present invention this objective is obtained by utilizing conventional shock absorber hydraulic fluid as the spring medium and an element smaller than and separate from the piston rod of the unit as the displacement member for the load bearing spring chamber.

Another object of the present invention is the provision of a unit of the type described operable to provide the damping function, normally provided by the replaced shock absorber, independently of the pressure conditions within the load bearing spring chamber of the unit.

The leveling system provided in the self-leveling units proposed in the prior art usually embodies a positive displacement pump mechanism and a bleed system both of which are operated in response to the telescopic movements of the unit. The fluid pressure within the load bearing spring chamber determines the spring force for any given position of movement. The spring force is transmitted to the sprung mass of the vehicle through a lift area provided on a displacement member which serves to increase and decrease the volume of the load bearing spring chamber and hence the pressure therein in response to the extending and contracting telescopic movements of the unit. The spring force is varied by means of the pump mechanism displacing fluid under pressure into the load bearing spring chamber and by means of the bleed system exhausting fluid under pressure from the load bearing spring chamber to the supply chamber during the telescopic movements of the unit.

In most instances the pump mechanism is made position responsive as well as the bleed system. A position responsive pump mechanism operates only during one-half of the stroke and hence provides operating characteristics which are quite undesirable. Since the pump mechanism must take in fluid at a supply pressure which is usually different from load pressure and displace that fluid into the load chamber at load pressure, the elements of the pump mechanism during the time the pressure therein is at load pressure become load bearing elements having a lift area of its own. Because the lift area provided by the pump elements has a variable pressure with respect to that acting on the lift area of the displacement member of the load bearing spring chamber, the spring force of the unit will change in response to the change in pressure within the pump elements. Where the pump elements are made position responsive and this change in pressure on the lift area thereof occurs during the mid-portion of the stroke, an abrupt change in the spring force will occur, resulting in the introduction of an uneven spring force at the most desirable operating level of the vehicle.

The usual means provided in the units proposed in the prior art for exhausting fluid from the load bearing chamber is a position sensitive bleed system. A typical arrangement is to provide a bleed orifice leading from the load bearing spring chamber which is closed during the contracting movement of the unit beyond the central position but which opens to the supply chamber during the extending movements beyond the central position. An arrangement of this type has distinct operating disadvantages. For example, when the vehicle moves through an extended curve, as for example, the curve of the clover leaf or the like, the inside units of the vehicle, due to centrifugal force, will be maintained in an extended position for a relatively extended period of time during which excessive bleeding can take place. Under these circumstances, when the vehicle moves out of the clover leaf, the level of the car will be tilted due to the lower position of the inside unit. Various arrangements have been proposed for alleviating this condition of conventional bleed systems. In general these proposals have embodied the provision of some sort of delay mechanism which renders the bleed system operable to lower the vehicle under static conditions which remain for an extended period of time, as when a passenger load is removed and the vehicle is standing but renders the bleed system inoperable under dynamic operation during short periods of time. Such arrangements, while alleviating the above-mentioned operating disadvantages of the usual bleed system, suffer from other disadvantages such as increasing the "hunting" characteristics of the unit.

The U.S. Pat. No. to Colmerauer, 3,380,247, dated Apr. 30, 1968, discloses a hydraulic arrangement including a piston pump with adjustable and reversible output which, in FIG. 4, is embodied in a self-leveling suspension unit. The hydraulic arrangement of this patent provides for the pumping of fluid from a supply chamber into the load bearing spring chamber during the movements of the unit beyond the central position in a contracting direction and for the pumping of hydraulic fluid from the load bearing spring chamber into the supply chamber during the movements of the unit beyond the central position in an extending direction. The arrangement is such that the same pump elements and chamber are utilized to effect both pumping actions so that during an even complete cycle of telescopic movement the amount of hydraulic fluid moved into and out of the load bearing spring chamber is substantially equal.

By providing a hydraulic arrangement in which hydraulic fluid is removed from the load bearing spring chamber by a positive displacement pump, the operational disadvantages of conventional bleed systems can be eliminated without the attendant disadvantages of an increase in the hunting characteristics of the unit. However, the variations of pressure within the single pump chamber of Colmerauer acts upon its separate lift area under extreme static load conditions so as to provide an abrupt change in the spring force as the unit moves through the central position.

It is a further object of the present invention to provide a self-leveling combined shock absorber and fluid spring unit having an improved leveling system which is useful both in primary suspension units as well as assist units embodying a positive displacement pump mechanism for effecting movement of hydraulic fluid from a supply into the load bearing chamber substantially throughout either or both the contracting or extending movements of the unit so as to eliminate abrupt changes in the spring force during movement throughout the central position and a positive displacement pump mechanism for effecting position responsive movement of fluid out of the load bearing spring chamber, the separate pump mechanisms having different operative strokes and displacements interrelated with respect to each other so that the amount of liquid moved into and out of the load bearing spring chamber during an even complete cycle of telescopic movement is substantially equal.

Another object of the present invention is to provide a unit having an improved leveling system of the type described in which the position sensitive pump mechanism for effecting movement of hydraulic fluid out of the load bearing spring chamber is provided with a load pressure responsive outlet valve which serves to minimize the introduction of abrupt changes in the spring force during the movement of the unit through the central position.

Another object of the present invention is the provision of a self-leveling combined shock absorber and fluid spring unit having a leveling system including a pump mechanism for effecting movement of hydraulic fluid into the load bearing spring chamber, the pump mechanism having an improved check valve assembly embodying a resilient member having a sleeve valve portion which engages with the exterior cylindrical surface of a rigid tubular end wall portion. Over an extensive area and an integral sealing portion extending radially inwardly from the valve sleeve portion, the exterior of the resilient member being in continuous communication with the hydraulic fluid under high pressure within the load bearing spring chamber and the interior of the resilient member being physically supported against extrusion as a result of such high pressure communication by a rigid anti-extrusion member operable to move in response to the establishment of a pump pressure in excess of load pressure to permit flow from the pump chamber to the load chamber between the valve sleeve portion and the cylindrical surface engaged thereby, such engagement due to the extensive area thereof, preventing reverse flow therebetween even though foreign particles should become lodged between the interengaged surfaces.

Another object of the present invention is the provision of a unit having an improved check valve assembly of the type described in which the sealing portion of the resilient member and the antiextrusion member provide a sliding seal with the exterior periphery of a pump rod.

Still another object of the present invention is the provision of a unit of the type described which is simple in construction, efficient in operation and economical to manufacture.

These and other objects of the present invention will become more apparent during the course of the following detailed description and appended claims.

The invention may best be understood with reference to the accompanying drawings wherein an illustrative embodiment is shown.

In the drawings:

FIG. I is a vertical sectional view of a self-contained, self-leveling combined shock absorber and fluid spring assist unit embodying the principles of the present invention, showing the parts in a position of substantially fully retracted telescopic relation.

FIG. 3 is a sectional view taken along the line 3—3 of FIG. 2; and

FIG. 4 is a sectional view taken along the line 4—4 of FIG. 2.

Figure 1:
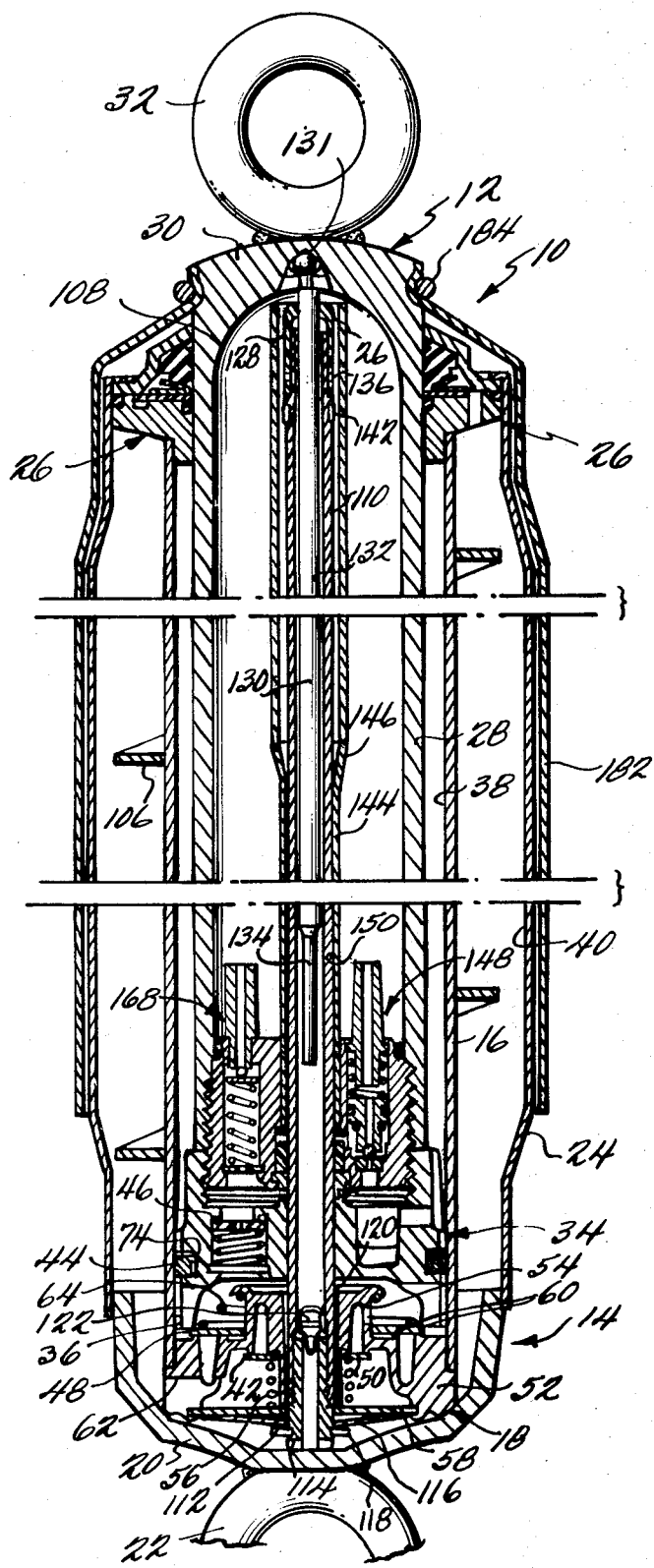

Referring now more particularly to FIG. 1 of the drawings, there is shown therein a self-leveling combined shock absorber and fluid spring assist unit, generally indicated at 10, embodying the principles of the present invention. The unit 10 is comprised in general of a pair of upper and lower tubular structures, generally indicated at 12 and 14, mounted for relative longitudinal movement with respect to each other in extending and contracting telescopic relation.

In the preferred embodiment shown, the lower tubular structure 14 includes cylindrical tubular member 16 having a base valve assembly, generally indicated at 18, fixedly secured within the lower end thereof. The base valve assembly 18 is fixedly mounted within a lower end cap element 20 which forms the outer end of the lower tubular structure. Suitable means for securing the lower end of the lower tubular structure to the unsprung mass of the vehicle is provided. The attaching means, as shown, is in the form of a ring connector 22, but it will be understood that other conventional types of connectors, such as stud connectors or the like may be utilized if desired.

Secured to the upper outer periphery of the end cap member 20, as by welding or the like is the lower end of an outer tubular member 24. The upper ends of the tubular members 16 and 24 are interconnected by an annular seal assembly, generally indicated at 26. The upper tubular structure 12 includes an elongated tubular member 28 having a cylindrical outer peripheral surface which slidably sealingly engages the annular sealing assembly 26.

The upper end of the tubular member 28 is closed by an end cap portion 30 which, as shown, forms an integral part of the tubular member 28. The end cap 30 forms the outer end of the upper tubular structure 12 and is provided with suitable means for connection with the sprung mass of a vehicle. As shown, the connection means is in the form of a conventional ring connector 32, although here again, it will be understood that any conventional attaching means, such as a stud connector or the like, may be utilized.

The lower end of the tubular member 28 has a piston assembly, generally indicated at 34, fixedly connected therewith which is slidably mounted within the tubular member 16 of the lower tubular structure. It can be seen that the cylindrical interior surface of the tubular member 16 defines a cylinder which is divided by the piston assembly 34 into a lower chamber 36 and an upper chamber 38. The lower chamber 36, is defined at its lower end by the base valve assembly 18. The upper chamber 38 is interiorly defined by the cylindrical exterior periphery of the tubular member 28, which constitutes a hollow tubular piston rod, and at its upper end by the seal assembly 26.

The chambers 36 and 38 are filled with hydraulic fluid of any conventional composition and maintained in such filled condition during the telescopic movements of the tubular structure by movement of hydraulic fluid into and out of a supply or reservoir chamber 40, defined by the exterior periphery of the tubular member 16, the interior periphery of the tubular member 24, the seal assembly 26, the end cap member 20 and base valve assembly 18. The three chambers 36, 38 and 40 constitute damping chambers between which hydraulic fluid flows during the telescopic movements of the tubular structures.

In this regard, during the movement of the telescopic structures in contracting telescopic relation, which corresponds with the compression stroke of the unit, the volume of the lower chamber 36 decreases while the volume of the upper chamber increases but at a different rate. Consequently, during the compression stroke, the hydraulic fluid is forced outwardly of the lower chamber 36, which constitutes a compression damping chamber, into both the upper chamber 38 and the supply chamber 40. Flow restriction and control for the purpose of achieving compression damping is provided by a compression valve member 42 forming part of the base valve assembly 18 and an annular valve member 44 carried by the piston assembly 34. During the relative movement of the tubular structures in extending telescopic relation, which corresponds with the rebound stroke of the unit, the volume of the upper chamber 38 decreases while the volume of the lower chamber increases at a greater rate. During the rebound stroke hydraulic fluid is forced outwardly of the upper chamber 38, which constitutes a rebound damping chamber, into the lower chamber 36. Flow restriction and control is provided by a valve member 46 carried by the piston assembly 34. Also during the rebound stroke hydraulic fluid from the supply chamber 40 flows into the lower chamber 38 to maintain the latter filled and this flow is controlled by a replenishing valve member 48 forming a part of the base valve assembly 18.

It will be understood that the flow restriction and control valve members 42 and 48 within the base valve assembly 18 may be of any suitable construction, such as embodied in conventional shock absorbers. In the preferred embodiment shown, the compression valve 42 is in the form of an annular disc which engages upwardly on a pair of concentric downwardly facing annular valve seats 50 formed in an inner annular portion of a base member 52. The inner annular portion includes a downwardly facing groove the lower end of which extends between the annular seats 50. The upper end of the annular groove is communicated with the lower chamber 36 as by a radial opening 54. It will be understood that the annular seat may be notched in accordance with conventional shock absorber practice if desired. In the preferred embodiment no such notches are provided and the compression valve 42 is resiliently urged into engagement with the annular seats by a coil spring 56 having its upper end in engagement with the lower surface of the compression valve and its lower end disposed in engagement with the upper surface of a centrally apertured disc element 58 adapted to be mounted within the lower end of the base member 52 in any suitable manner as by swaging or the like.

The replenishing valve 48 is adapted to engage a pair of upwardly facing concentric annular valve seats 60 formed in an outer peripheral portion of the base member 52. These valve seats communicate with the upper end of an annular groove, the lower end of which communicates with a radial passage 62 formed in the adjacent portion of the base member 52. The replenishing valve is resiliently maintained in engagement with the valve seats 60 by a helical coil spring 64, the lower end of which engages the upper surface of the valve member 48 and the upper end of which is secured to the inner peripheral portion of the base member 52 as by swaging or the like.

Figure 2:
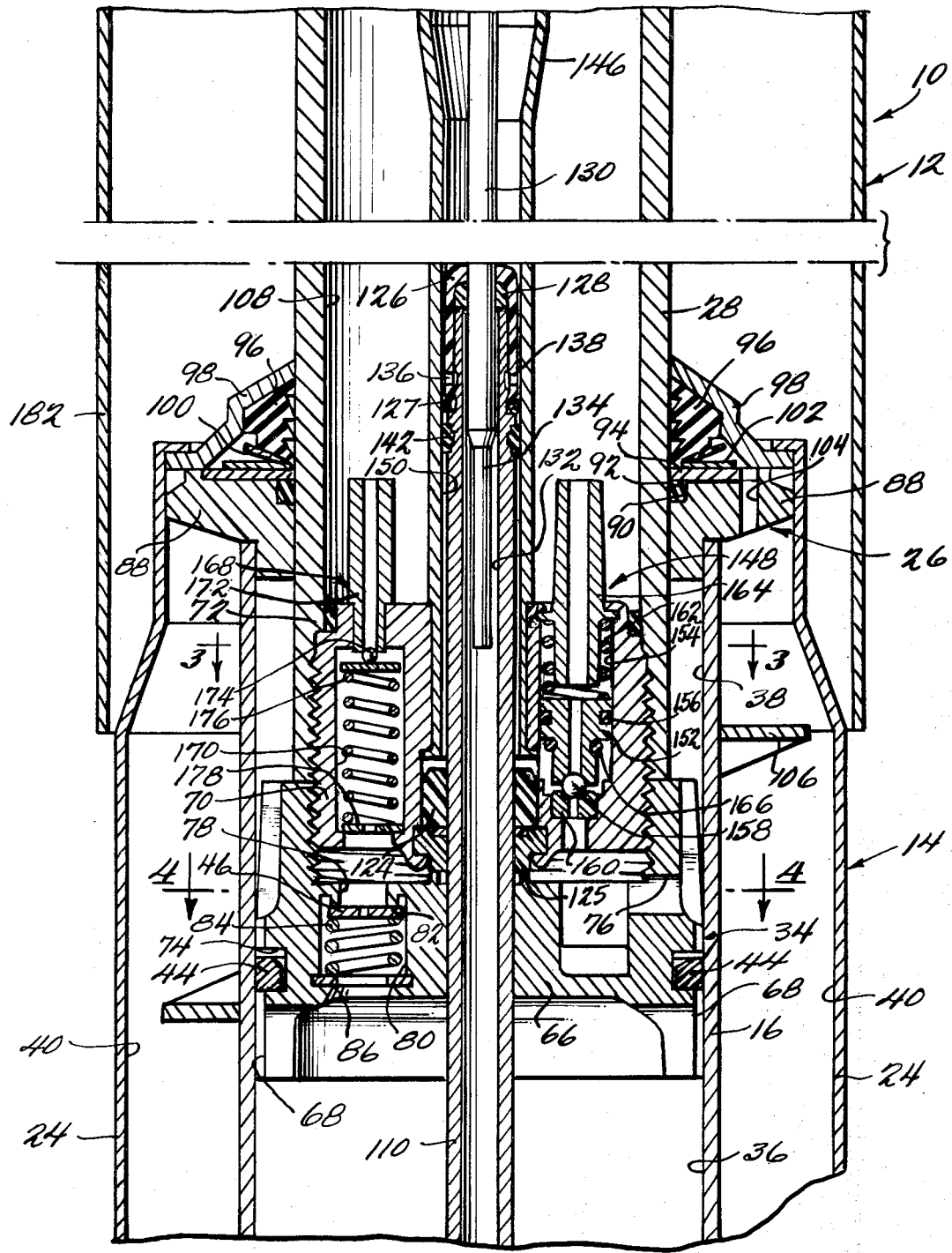
FIG. 2 is an enlarged fragmentary vertical sectional view illustrating the position of the parts in substantially fully extended telescopic relation.

The flow restriction and control valves embodied in the piston assembly may likewise be of any suitable construction, such as embodied in conventional shock absorbers. In the preferred embodiment, as best shown in FIG. 2, the valve member 44 is in the form of a split ring of rectangular cross-section having its upper inner corner cut off to a point closely adjacent its upper outer corner. The split ring serves to control flow across the periphery of the piston assembly and to this end, the piston assembly includes a piston member 66 having its outer periphery formed with a plurality of circumferentially spaced axially extending grooves 68. The upper end of the piston is disposed in abutting engagement with the lower end of the tubular member 28 constituting the piston rod. The lower interior surface of the tubular member 28 is interiorly threaded along with a corresponding bore in the piston member to receive an exteriorly threaded plug member 70 which serves to rigidly interconnect the piston member and piston rod 28. Preferably an annular seal 72 is provided between the upper outer periphery of the plug member 70 and adjacent inner periphery of the piston rod.

The flow restriction and control valve member 44 is mounted within an annular groove 74 formed in the outer peripheral portion of the piston member, the annular groove having a vertical size greater than the vertical size of the valve member 44. During the compression stroke, the valve member 44 moves upwardly within the groove 74 permitting a controlled restricted flow from the lower portion of the axial grooves 68 radially into the annular groove 74 and then radially outwardly past the cut-off upper inner corners of the valve member 44 through the upper portion of the axial grooves 68 into the upper chamber 38. During the rebound stroke, the valve member 44 moves downwardly within the annular groove 74, the lower downwardly facing flat surface thereof engaging the upwardly facing flat surface of the annular groove 74 so as to provide a seal preventing flow across the periphery of the piston member. The valve member 44 therefore insures that this latter flow will be restrictively controlled by the rebound damping valve 46. In the preferred embodiment shown a flow path from the upper chamber 38 to the lower chamber 36 is provided by a radial passage 76 extending inwardly from the exterior periphery of the piston member to the upper interiorly threaded bore thereof. The interiorly threaded bore also communicates with a bore 78 having its axis spaced radially outwardly of the axis of the piston member 66. The lower end of the bore 78 is counterbored, as indicated at 80, so as to form a downwardly facing annular seat 82 against which the rebound control valve member 46 engages. Here again, the valve seat may be notched in accordance with conventional practice although as shown, no such notches are provided. The valve member 46 is in the form of a solid disc having its periphery formed with flats to provide for flow thereby. Preferably, the valve member is resiliently urged into engagement with the seat 82 by a coil spring 84, the upper end of which engages the valve member and the lower end of which engages a washer 86 suitably secured within the lower end of the counterbore 80, as by swaging or the like.

The seal assembly 26 may likewise be of any suitable construction, such as that utilized in conventional shock absorbers. In the preferred embodiment as best shown in FIG. 2, the seal assembly includes an annular plug member 88 which is preferably made of a porous material, such as sintered metal. The annular plug member 88 includes an inner annular portion which is engaged within and rigidly secured to the upper end of the tubular member 16. The interior periphery of the interior portion of the plug member slidably engages the exterior periphery of the piston rod 28 and has an annular groove 90 formed in its upper surface within which an annular seal 92 is engaged. The seal is maintained within the annular groove by a washer 94 which seats within an annular groove formed within the upper surface of the plug member 88. An annular wiper seal 96 is mounted above the washer 94 and has its upper outer frustoconical periphery disposed in engagement with an annular cap element 98. The cap element includes a radially outwardly extending flange portion which engages the upper surface of the plug member over which the upper end of the outer tubular member 24 is turned, in accordance with conventional practice. The lower outer frustoconical periphery of the annular wiper seal 96 engages a retainer washer 100 which is resiliently urged into engagement with the wiper seal by a Bellville spring washer 102 seated on the washer 94.

The outer periphery of the washer 94 and the adjacent portion of the plug element 88 are formed with a hydraulic fluid return passage 104 through which any hydraulic fluid on the exterior periphery of the piston rod which may pass the seal 92 and is displaced by the wiper seal 96 may flow back into the supply chamber 40. In order to minimize the mixture of air with the hydraulic fluid within the supply chamber a helical baffle 106 of conventional construction may be mounted within the chamber 40.

In accordance with the principles of the present invention, the unit 10 is provided with a load bearing fluid spring chamber 108 which, in the preferred embodiment shown, is formed within the interior of the tubular member 28 constituting the piston rod. In the preferred embodiment shown this chamber is filled with the same hydraulic fluid utilized in the damping chambers. The volume of the load bearing fluid spring chamber 108 is decreased and increased in response to the relative movements between the tubular structures in contracting and extending relation respectively by a displacement member 110 which is carried by the lower tubular structure. In the preferred embodiment shown, the displacement member 110 is in the form of an elongated hollow tube having its lower end longitudinally fixed to the base member 52 by means preventing the transmission of bending stresses to the tube. As shown, this means takes the form of a tubular fitting 112 which is threadedly engaged within the lower end of the member 110. The lower end of the tubular fitting engages the upwardly facing central surface of the cap structure 20 and is provided with radially extending slots 114 which serve to communicate the supply chamber 40 to the interior of the fitting. The fitting extends through the central opening in washer 58 and through an upwardly tapering central opening formed in the base member 52. The lower end of the fitting is resiliently held in engagement with the cap 20 by a Bellville spring washer 116 having its upper outer edge engaged with the washer 58 and its lower inner edge engaged with a snap ring 118 engaged within an exterior peripheral groove within the lower portion of the tubular fitting 112. Mounted on the upper end of the tubular fitting 112 in engagement with the inner periphery of the member 110 is an O-ring seal 120 forming an annular valve seat for an inlet check valve element 122, which is retained within the member 110 against excessive upward movement by a conventional retainer or other suitable means.

The tubular member 110 not only serves as a displacement member but as a component pump element of the leveling system as well. To this end, the tube 110 extends through a central opening in the piston member 66, and a seal 124, of suitable sealing material, is mounted between the piston member 66 and plug member 70 which slidably sealably engages the cylindrical exterior periphery of the tubular member 110. The seal 124 is retained in its operative position by a retainer element 125 fixedly engaged within the lower central portion of the plug member 70, as by swaging or the like, and having an antiextrusion washer in the upper portion thereof.

The upper end of the tubular member 110 has an annular pump seal and check valve member 126 mounted thereon. As best shown in FIG. 2, the member 126 which is preferably molded of a suitable sealing material, such as polyurethane or the like, includes a valve sleeve portion fitted over the upper end of the tubular member 110 and having its lower end fixedly secured thereto, by any suitable means, such as a crimp ring 127 engaging the lower end of the valve sleeve portion of the member 126 and retaining the same within a suitable annular groove formed in the exterior periphery of the tubular member 110. The member 126 also includes a sealing ring portion extending inwardly from the upper end of the valve sleeve portion which is maintained in spaced relationship to the end of the tubular member 110, by an anti-extrusion washer 128. The sealing ring portion of the member 126 and the associated anti-extrusion washer 128 are adapted to slidably sealingly engage the exterior periphery of a cooperating pump element in the form of a pump rod 130 having its upper end secured within the cap portion 30, by a ball and socket connection, indicated at 131, which permits limited relative angular movement therebetween but insures a relatively longitudinal fixed relationship therebetween. The pump rod 130 extends through the sealing ring portion of the member 126 and washer 128 and into the interior of the tubular member 110, such interior between the inlet check valve 122 and the washer 128 defining a pump chamber 132 which decreases and increases in volume in response to the relative movement between the tubular structures in contracting and extending relation respectively.

It will be noted that the pump rod 130 is of constant exterior diameter dimension substantially throughout its length but includes a lower end portion 134 of relatively short longitudinal extent of a reduced exterior diameter dimension. The purpose of the reduced portion 134 is to insure that the pump chamber 132 can be initially primed with hydraulic fluid to the exclusion of any air. When the unit is extended to its fullest possible extent, the reduced portion 134 is disposed within the pump seal and check valve member 126 and washer 128 to permit such removal of any air within the pump chamber which may become otherwise trapped therein.

It will be understood that during the rebound stroke of the unit, pump rod 130 moves outwardly of the pump chamber 132, thus increasing the volume therein. The hydraulic fluid to fill this increasing volume comes from the supply chamber 40 through the fitting 112 and past the inlet check valve 122. During the compression stroke, pump rod 130 moves within the pump chamber 132, decreasing its volume so as to pressurize the hydraulic fluid therein. The pressurized fluid is introduced into the load bearing fluid spring chamber 108 through radial outlet openings 136 formed in the valve sleeve portion of the member 126 at a position spaced slightly above the crimp ring 127. As shown, an annular groove 138 is formed in the adjacent periphery of the tubular member 110 to facilitate the flow of hydraulic fluid through the openings 136. It will be noted that the hydraulic fluid within the pump chamber 132 will flow axially outwardly of the end of the tubular member 110, then radially outwardly between the washer 128 and the end of the tubular member 110, and then axially between the exterior of the tubular member 110 and interior of the valve sleeve portion of the member 126 until it reaches the annular groove 138. The valve sleeve portion of the member 126 thus functions as an effective check valve preventing flow of hydraulic fluid in the reverse direction from the chamber 108 into the pump chamber 132.

The tubular member 110 not only serves to define the pump chamber of the pump mechanism utilized to introduce hydraulic fluid under pressure into the load bearing spring chamber 108 but, in addition, includes a pump element in the form of an annular seal 142 mounted within an exterior groove on the tubular member 110 in a position below the crimp ring 127 which forms a part of a pump mechanism for displacing hydraulic fluid out of the load bearing spring chamber. The exterior periphery of the pump element 142 is adapted to cooperate with a pump tube 144 in the form of tubular element having its lower end fixedly engaged within a central opening formed in the plug member 70 and its upper end spaced closely below the end cap portion 30. The lower portion of the pump tube 144 is of an interior diameter to slidably engage the pump seal 142 while the upper portion is of a greater interior diameter; the upper and lower portions being interconnected by a central frustoconical portion indicated at 146. The longitudinal extent of the lower operative portion of the pump tube 144 is such that the pump element 142 will engage within the frusto-conical portion 146 when the tubular structures are disposed in the desired central position at which the sprung mass of the vehicle is to be maintained (as for example 5—5 position).

It can be seen that under these circumstances there will be no cooperation and hence no pumping action during the relative movement between the tubular structures beyond this central position in the direction of the contracting relation or in the direction of the compression stroke. On the other hand, the pump element 142 will move in cooperating relation with the pump tube 144 during the relative movements of the tubular structures beyond the central position in an extending direction or in the direction of the rebound stroke.

In accordance with the principles of the present invention, a load pressure responsive valve mechanism, generally indicated at 148, is provided for effecting the pumping action. It will be noted that during the cooperating movement of the pump element 142 with the pump tube 144, an elongated annular chamber 150 is defined by the interior periphery of the pump tube, the exterior periphery of the tubular member 110, the pump element 142, the annular seal 124 and the valve mechanism 148.

The valve mechanism 148 includes a valve member 152 of tubular construction which is mounted within a longitudinally extending through passage 154 formed in the plug member 70 in offset relation with the axis thereof. The valve member 152 includes an upper piston portion having an O-ring seal 156 mounted in an annular groove in the exterior periphery of the upper portion of the passage 154. Mounted within the lower end of the valve member 152 in fixed closing relation thereto is a spherical ball valve element 158 adapted to cooperate with a valve seat element 160. The valve seat element 160, as shown, is in the form of an insert mounted within a reduced portion of the passage 154 and includes a restricted passage therethrough which constitutes an outlet for the pump chamber 150 which is opened and closed by engagement of the ball valve element 158 with the seat element 160. Preferably, the valve member 152 is resiliently biased into a direction to engage the valve element 158 with the valve seat 160 and, as shown, such bias is provided by a coil spring 162 mounted within the upper end of the passage 154 with its lower end in engagement with the valve member 152 and its upper end in engagement with a central peripheral flange formed on a tubular insert 164 fixedly mounted within the upper end of the passage 154, as by swaging or the like.

The valve member 152 also provides an inlet port for the pump chamber which, as shown, is in the form of a plurality of radially extending passages provided in the central portion of the valve member below the upper piston portion thereof. The inlet port arrangement is controlled by a check valve which, as shown, is in the form of an O-ring valve element 166 of resilient material suitably mounted on the exterior periphery of the valve member 152 in closing relation with the inlet ports provided therein.

As can be seen, the upper surface of the valve member 152 has the load pressure of the hydraulic fluid within the load bearing spring chamber 108 acting thereon at all times. The restricted outlet passage in the valve seat 160 is relatively small in area with respect to the upwardly facing area of the valve member 152 so that only a slight increase above load pressure in the pressure of the hydraulic fluid within the pump chamber 150 acting upwardly on the valve member 152 is necessary to overcome the combined force of the load pressure and the relatively light pressure of the spring 162. In this way, the hydraulic fluid which is discharged through the outlet opening in the valve seat element 160 is maintained at a value which is at all times slightly greater than the load pressure. This discharge will occur during the rebound stroke of the unit beyond the center position when the pump element 142 moves downwardly within the pump tube 144 decreasing the volume in the pump chamber 150. During the compression stroke beyond the center position, the pump element 142 moves upwardly increasing the volume of the pump chamber 150, thus reducing the pressure of the fluid therein, which causes the valve member 152 to move downwardly into a position wherein the valve element 158 closes the outlet opening in the valve seat element 160 under the combined action of the load pressure and the pressure of the spring 162. During this movement when the pump chamber pressure is reduced to a value below the load pressure, flow of fluid past the O-ring check valve element 166 will take place to charge the pump chamber 150.

Preferably, the unit 10 is provided with a pressure relief valve mechanism, generally indicated at 168, which serves to limit the maximum pressure which can be generated within the load bearing fluid spring chamber 108. The pressure relief valve mechanism 168 constitutes a safety feature and is ineffective during the normal operation of the unit. The valve mechanism may be of any suitable construction and in the preferred embodiment shown, the pressure relief valve mechanism is mounted within the plug member 70 of the piston assembly 34. As shown, the plug member is formed with a longitudinal passage 170 extending therethrough in offset relation to the axis thereof. Mounted in the upper end of the passage 170 is a tubular valve element 172, the lower end of which provides a valve seat for engagement by a ball valve element 174. Any suitable means may be provided for resiliently biasing the ball valve element 174 into engagement with the valve seat to provide the desired blow-off when the particular maximum pressure is reached within the chamber 108. As shown, such means includes a coil spring 176 disposed within the passage 170 having its upper end connected with the ball valve element 174 by a suitable washer and its lower end anchored to the plug member as by an apertured washer 178 fixed within the lower end of the passage as by swaging or the like.

In order to protect the unit during operation, the upper tubular structure includes an outer dust tube 182 of a size to closely embrace the outer tubular member 24 of the lower tubular structure. The upper end of the dust tube is necked inwardly and secured to the other periphery of the cap portion by any suitable means, as for example a snap ring 184, or the like.

OPERATION

The manner of assembling the present unit and charging it with a quantity of conventional hydraulic fluid is of a conventional nature so that a description thereof is believed unnecessary. The assembled unit with a charge of hydraulic fluid therein is adapted to be connected between the sprung and unsprung masses of a vehicle having a conventional suspension system in place of the conventional shock absorber of the suspension system. Thus, two such units would normally be provided in place of the two rear shock absorbers of the vehicle. The mode of operation and the operational advantages achieved by the unit 10 of the present invention can best be understood by considering the spring function, the damping function and the leveling function separately.

First, with respect to the spring function, the preferred embodiment provides the spring function by compression of hydraulic fluid within the load bearing fluid spring chamber 108 due to the change in volume of the chamber by the displacement member 110. This arrangement is advantageous in that high spring energy is available within a relatively small space, and space considerations in an assist unit are of critical importance. For example, in order for a unit to have applicability to a sufficiently wide range of existing suspension systems, it is generally recognized that the assist unit cannot exceed approximately 3 inches in diameter and that the unit must provide a stroke of approximately 10 inches, with a dead length which does not exceed approximately 3 inches. The operational requirements of an assist unit provide additional restrictions in terms of the range of additional static load on the vehicle which can be handled thereby. For example, in order for a unit to provide such operating characteristics, it is generally recognized that the range of added static load is from 0 to approximately 500 pounds per unit.

This operational requirement, when considered in conjunction with the size requirement, virtually precludes the utilization of air as a fluid spring medium as embodied in the proposed units of the patented prior art. The amount of volumetric change within the load bearing chamber required to obtain the full range of load carrying capability requires that the load bearing spring chamber have a volume and a displacement member with sufficient lift area which simply exceeds the size limitations. The biggest volumetric requirement where air is used as the fluid spring medium comes at the no-load end of the load range. In order to achieve this no-load and hence no-load pressure capability where the air has an interface with the hydraulic fluid, an excessive volume must clearly be provided. Where the air is sealed within the load bearing fluid spring chamber with respect to the hydraulic fluid therein, the same situation exits because the element which seals the air must fully expand until the air reaches atmospheric pressure while in contact with the hydraulic fluid. The possibility exists that air can be utilized within the space requirements if some means were provided for limiting the expansion of the air-sealing element when the air reaches a predetermined lower value considerably above atmospheric pressure. Arrangements of this type, while possible and contemplated by the present invention, are not preferred because of the operational problems presented, including the difficulty of sealing air under very high pressures such as would be encountered at the upper end of the load range. One possibility in this regard would be to provide, for example, an annular air chamber within the chamber 108 defined by the interior surface of the piston rod and a sleeved element formed of a material having very high resilient characteristics, as for example, copper or the like. Thus, while a liquid spring effect is preferred, the present invention contemplates a combined liquid and air spring arrangement of the type described above which distinguishes basically from the hydropneumatic units proposed in the prior art. It is recognized that several of the units proposed in the prior art contemplate hydraulic fluid as the sole spring medium. The manner in which the spring effect is achieved by the present invention constitutes a distinct improvement over these arrangements, examples of which are contained in the following U.S. Pat. Nos.: Ord, 2,987,310, dated June 6, 1961; Lush et al., 3,074,708, dated Jan. 22, 1963, Bittel, 3,076,643, dated Feb. 5, 1963; and Jewell et al., 3,480,269, dated Nov. 25, 1969.

In all of these prior art arrangements, the displacement member for the liquid spring chamber constitutes the piston rod of the unit. Where the piston rod is used as the displacement member, strength requirements limit the minimum lift area which can be provided by the displacement member.

In this regard it should be noted that the strength required to insure the structural integrity of the piston rod is dictated by the tortional or bending forces imposed on the piston rod, rather than the compressive forces. Conventional shock absorbers are mounted between the sprung and unsprung masses of the vehicle in an angular position with respect to the vertical which has sometimes been referred to in the art as sealeg fashion. This type of mounting introduces a component of pivotal movement which, in turn, introduces centrifugal forces which transmit bending moments to the unit. Because of the added weight of units of this type, these centrifugal forces become a limiting factor which is not presented in conventional shock absorbers. Consequently, the piston rod must have a diameter which is greater than the diameter size of the conventional shock absorber. Thus, given a minimum diameter size for the piston rod and the operational requirement that the piston rod area determines the displacement, it becomes necessary to increase the volume of the load bearing spring chamber when dealing with hydraulic fluids of relatively high modulus of elasticity (such as conventional hydraulic fluids) so that the package requirements of an assist unit are exceeded.

It can be seen that with the present unit, the displacement member is separate from the piston rod. The piston rod of the present structure can be made rather large and, indeed, such size is operationally desirable. Moreover, the piston rod can have a relatively large wall thickness. The piston rod, together with the piston assembly carried thereby, the cylinder within which the piston assembly reciprocates, and the seal assembly 26, which slidably sealingly engages the piston rod, serves to resist the excessive bending forces imposed on the unit during operation. The size of these elements which is dictated by strength characteristics, are independent of the displacement requirements which are provided by a separate member. The displacement member need only have column strength and, indeed, in the preferred embodiment is mounted within the unit so that bending stresses cannot be transmitted thereto. By providing a separate displacement member, the amount of displacement and lift area can be minimized, so that within the size requirements of an assist unit a liquid spring effect can be obtained with the use of conventional hydraulic fluids, and it is not necessary to utilize special fluids having a lower modulus of elasticity or to provide air pocket arrangements such as described above. In the preferred embodiment, the displacement member is telescopically arranged with respect to the piston rod, although it will be understood that it is within the contemplation of the present invention to provide a separate displacement member or members which are mounted in longitudinally co-extensive relation with the piston rod and have a diameter dimension or cross sectional area less than that of the piston rod.

The utilization of a liquid spring with a relatively small displacement and lift area is of further advantage with respect to the no-load requirements of an assist unit. In this regard, it is important to understand the different requirements of a self-leveling unit at minimum load conditions and a primary suspension unit at minimum load conditions. Where the unit is used as a primary suspension unit, the unit carries its proportionate share of this minimum load and the position at which self-leveling occurs can be chosen at the most desirable height, as for example, at a 5—5 position. Since the unit must provide the sole spring force under minimum load conditions, the load bearing spring chamber will have a load pressure when the unit is maintained at its desired level, and even under full extension, the pressure would not reduce to a value below atmospheric pressure.

On the other hand, where the unit is to be used as an assist unit, the springs of the conventional suspension system provide the spring force for supporting the minimum load at a predetermined position which usually is above the most desirable central position, as for example, at a 6–4 position. Thus, if an assist unit is to provide a spring force under minimum conditions, the unit must assume the burden of supporting a portion of the load, and this can only be accomplished by maintaining the sprung mass at a higher position than the conventional spring, as for example at a 6¾ - 3¼ position. This position, then, would become the position at which the unit self-levels as additional static loads are encountered. A unit having this operating characteristic would simply build in the disadvantages of coil spring and air spring assist units at minimum loads throughout the entire load range and obtain only the advantage of eliminating the inconvenience of introducing and exhausting air from the air chamber. Of course, it is recognized that maintenance of the rear end of a vehicle at a relatively high operating level is regarded by some as a desirable result in and of itself. However, where this result is not desired, an assist unit must have the capability of operating under no-load conditions.

With the present unit, the position at which self-leveling occurs is desirably chosen at a 5—5 position. Since most conventional suspension systems are maintained at a position above this under minimum load conditions, the assist unit of the present invention will not begin to assume a portion of the load until sufficient static load has been added to stress the conventional system to the 5—5 position. Within this minimum portion of the overall range, the present unit, therefore, does not carry a load at the static level position. A no-load condition within the load bearing spring chamber means essentially that the pressure within the chamber is not above atmospheric pressure. However, as will be explained more fully hereinafter, the present unit preferably operates with negative pressures within the load bearing spring chamber. However, the range of negative pressures contemplated does not exceed the vapor pressure of the liquid. Such limited negative pressures translated in terms of the negative spring forces produced in the unit are of the order of fifteen pounds at the most and hence may be disregarded for all practical purposes as far as the spring function is concerned.

With respect to damping characteristics, the no-load characteristics which result in negative pressures within the load bearing spring chamber when the unit is used as an assist unit has a critical bearing on the damping characteristics. The damping function in the units proposed in the prior art, including all of the liquid spring unit proposals, is obtained by flow control elements within the load bearing spring chamber. Under these circumstances, flow through the damping valve mechanism is accomplished at least during either the compression or rebound stroke by the pressure of the fluid so that when, under no-load conditions, the pressure of the hydraulic fluid reduces to atmospheric pressure and below, the damping function is simply lost during that stroke. The loss of the damping function can be a serious disadvantage, even within a small range of the total range of operation, particularly since minimum load conditions are quite frequently encountered. The problem is emphasized where the unit is an assist unit which is to replace the damping function provided by the conventional shock absorber.

The present unit obviates these disadvantages by separating the damping function from the load bearing spring chamber. With the present unit the damping function is obtained irrespective of the pressure within the load bearing spring chamber and, indeed, even if hydraulic fluid failure should occur in this chamber, the unit would still function to provide the damping which has been eliminated by the removal of the conventional shock absorber. The provision of a positive damping function through both the compression stroke and the rebound stroke, irrespective of the pressure within the load bearing spring chamber, is an essential characteristic of an assist unit in accordance with the principles of the present invention. Preferably, this essential characteristic is obtained by establishing the damping function independent of the load bearing spring chamber, although it is within the contemplation of the present invention to achieve this essential characteristic without such separation by insuring that the damping function will be accomplished by forcing controlled, restricted fluid flow by confinement within rigid walls arranged telescopically so that flow is not dependent upon the pressure of the fluid.

The leveling function advantages of the present invention have applicability both to assist units and to primary suspension units. These advantages can likewise be achieved, therefore, equally in units where the spring effect is obtained by a liquid medium only, as well as by a combination of liquid and air mediums in accordance with conventional practice. The leveling function of the present unit achieves two highly desirable advantages. First, the system eliminates abrupt changes in spring force during the movement of the unit through its central position, both during the compression stroke and the rebound stroke. Second, the leveling system utilizes positive displacement of hydraulic fluid from the load bearing spring chamber, as well as the positive displacement of hydraulic fluid into the spring chamber. The accurage control of both introduction and exhaust of hydraulic fluid is obtained while the disadvantages inherent in bleed systems are obviated and the hunting characteristics of the unit are minimized in comparison with fluid systems having delay mechanisms built therein.

These results are obtained by providing a pump-up mechanism having a pressure stroke which corresponds substantially to either the compression stroke or to the rebound stroke, or both, of the unit. In the preferred embodiment, the pressure stroke of the pump-up mechanism occurs during the compression stroke of the unit. It will be noted that since the hydraulic fluid within the pump chamber 32 of the pump-up mechanism is displaced into the load chamber during the pressure stroke, the pressure within the pump chamber will be equal to load pressure, and hence the pump elements serve to augment the spring force provided by the displacement member and the load bearing spring chamber. In the preferred embodiment, the hydraulic fluid under load pressure within the pump chamber 132 during the compression stroke acts upon the lift area provided by the pump rod 130, to wit, its cross sectional area, but it will be noted that during the rebound stroke, when the pressure within the pump chamber changes to supply chamber pressure or atmospheric pressure, this augmenting spring force no longer is acting on the lift area of the pump rod. However, it will also be noted that this change in the lifting force due to the change in pressure within the pump chamber occurs when the direction of telescopic movement of the unit changes, and consequently the abruptness in the change of the lift force is not so readily discernible to the vehicle passenger. A pump-up mechanism which is operable only during the movement of the unit in contracting relation beyond its central position, such as that included in many of the prior art proposals, must of necessity result in an abrupt change in the spring force as the unit is moved through the central position either during the compression stroke or the rebound stroke, or perhaps both. Where this change in the spring force is noticeable to the passengers it constitutes an essentially undesirable operating characteristic.

The pump-up mechanism of the present invention can be made to operate throughout the compression stroke because of the provision of the separate pump-down mechanism which is operable only during the operation of the movement of the unit in the extending direction beyond the central position, and hence is position responsive.

It will also be noted that the load pressure responsive valve mechanism 148 of the pump-down mechanism serves to minimize abrupt changes in the spring force through the central position. By maintaining the discharge pressure of the pump-down chamber substantially equal to the load pressure, the pressure conditions acting upon the pump elements of the pump-down mechanism will not create an augmenting spring force having abrupt changes throughout either the compression stroke or rebound stroke, and particularly during the movement through the mid-portion where the pump elements become operable.

By providing separate pump mechanisms with different strokes and different displacements, self-leveling can readily be achieved. In the preferred embodiment of the present invention, the displacement of the pump-up mechanism is approximately one-half the displacement of the pump-down mechanism but has a stroke approximately twice that of the pump-down mechanism. Consequently, where the unit is moved through an even complete cycle of operation (i.e., beginning at the central position through a compression stroke, then through a rebound stroke past the central position to an extent equal to the compression stroke, and finally through a compression stroke back to the central position) substantially the same amount of hydraulic fluid will be moved into and out of the load bearing spring chamber. Thus, whenever the static load carried by the sprung mass of the vehicle is supported statically with the unit in its designed leveling position (e.g., a 5—5 position), dynamic operation will serve to maintain the sprung mass and the static load at the 5—5 position as a mean operating level.

When the static load is increased, the unit will now operate to support the changed static load statically at a position below the 5—5 position (e.g., 4–6), which will be the initial mean operating level when dynamic operation is commenced. A cycle of operation which begins and ends at a level below the 5—5 position, however, will result in a net movement of hydraulic fluid into the load bearing spring chamber since the operative stroke of the pump down mechanism is less than one-half of the operative stroke of the pump up mechanism. For example, in a cycle which goes from 4–6 to 3-7 to 5—5 to 4–6, the pump up mechanism will pump into the chamber during the compression strokes from 4–6 to 3–7 and from 5—5 to 4–6 but no pumping out will occur since the pump down mechanism is operable only above the 5—5 position. Since each such operating cycle results in a net movement of hydraulic fluid into the load bearing spring chamber, after a short period of dynamic operation, the mean operating level will become the designed level (e.g. the 5—5 position).

When the static load is decreased, the unit (assuming that it is being used in a primary suspension mode) will now serve to support the sprung mass statically at a level above the 5—5 position (e.g. 6–4) which will be the initial mean operating level when dynamic operation is commenced. A cycle of operation which begins and ends at a level above the 5—5 position will result in a net movement of hydraulic fluid out of the load bearing spring chamber since the operative stroke of the pump down mechanism is now more than one-half the operative stroke of the pump up mechanism. For example, in a cycle which goes from 6–4 to 5—5 to 7-3 to 6–4, the pump up mechanism will pump into the chamber during the compression strokes from 6–4 to 5—5 and from 7-3 to 6–4; but pumping out will occur throughout the entire rebound stroke from 5—5 to 7-3, resulting in twice as much fluid being pumped out as is pumped in due to the double displacement of the pump down mechanism. Since each such operating cycle results in a net movement of hydraulic fluid out of the load bearing spring chamber, after a short period of dynamic operation, the mean operating level will become the designed level (e.g., the 5—5 position).

It is important to note the difference in the pump down operation of the unit when the unit is used in an assist mode at a designed level below the level at which the sprung mass of the vehicle is normally maintained by the conventional suspension system and the decrease in the static load brings the static load to a value which will not move the sprung mass statically into the designed level of the unit. Basically, it will be noted that under these conditions, the conventional suspension system operates to resist the movement of the sprung mass into a 5—5 position which the operation of the unit seeks to obtain. Assuming that the conventional suspension system normally supports the new decreased static load at the new level of 6–4 to which the unit has moved as a result of the decreased static load, commencement of dynamic operation will, as previously noted, result in a net movement of hydraulic fluid out of the spring chamber. However, since the conventional suspension system supports the sprung mass at the 6–4 position, the outward movement of fluid does not result in a lowering of the mean operating level as is the case in the primary suspension mode. Instead, the mean operating level remains substantially at the 6–4 position and the pressure within the load bearing spring chamber is progressively reduced until it reaches a negative value equal to the vapor pressure of the hydraulic fluid. Once this pressure is reached, further reduction in pressure will not occur until the chamber is substantially emptied of hydraulic fluid.

In accordance with the principles of the present invention, the construction of the pump down mechanism is such as to limit the extent to which the chamber 108 can be emptied of hydraulic fluid under these conditions. By limiting the amount of hydraulic fluid which can be extracted from the chamber 108, a much more rapid response to an increase in static load is insured.

This operational advantage can be illustrated by considering a typical assist mode use where the vehicle is being used during the weekdays as transportation for a single driver to and from work and during the weekend for the entire family hauling a trailer to and from a weekend retreat. In this example, assume that the static load during weekday use would normally produce a 6–4 sprung mass position by virtue of the conventional suspension system and the weekend use a 3–7 position and that the assist unit of the present invention when installed is set to level at a 5—5 position for the particular vehicle involved. For sake of convenience, the description of such a cycle of operation is chosen at the end of the weekend when the trailer has been unhitched and the static load removed. Upon removal of the weekend static load, the hydraulic fluid within the chamber 108, being under pressure, will function to move the sprung mass of the vehicle upwardly until it assumes a sufficient proportional share of the load of the sprung mass to reach a position of static equilibrium (e.g., 6¾ – 3¼). When dynamic weekday operation is commenced, hydraulic fluid will be progressively pumped out of the chamber 108 reducing the pressure therein and progressively lowering the position of static equilibrium until the hydraulic pressure, at the static load position of 6–4, is equal to atmospheric pressure. At this point, the conventional suspension system assumes support of all of the sprung mass load at the 6–4 position with the unit being at a no-load condition. The unit will assume a load and a positive chamber pressure condition when the sprung mass moves dynamically downwardly below the 6–4 position and a negative pressure condition when the sprung mass moves dynamically upwardly above the 6–4 position. As dynamic operation continues, the range of pressure conditions within the chamber 108 further decreases without an attendant lowering of the mean operating level, as aforesaid. This lowered pressure range will quickly include a minimum pressure equal to the vapor pressure of the hydraulic fluid. Once this minimum pressure is reached, further removal of hydraulic fluid will result in the creation of a greater amount of vaporized fluid (and/or entrained air) being present in the chamber without an attendant reduction in pressure. Whenever the pressure of the hydraulic fluid within the chamber 108 is at the vapor pressure of the fluid during the suction stroke of the pump down mechanism (i.e., the compression movement of the unit above the center position), flow of fluid to the pump chamber 150 from the chamber 108 across the valve 166 will not occur until a lower pressure is created in the pump chamber. However, so long as there is sufficient hydraulic fluid in the pump chamber to vaporize as the pump chamber 150 expands in volume, the pump chamber pressure will remain the same as the vapor pressure and the suction stroke will result in the creation of a vapor pocket within the pump tube 144 below the pump seal 142.

Assuming a dynamic operation in which the unit is compressed beyond the 5—5 position with reasonable frequency, the vapor pocket created in the pump tube 144 will be communicated with the liquid in the pump tube 144 above the seal 142 as soon as the seal reaches the portion 146, which liquid will displace the vapor pocket upwardly through the tube 144, effectively replenishing the pump chamber 150 so that during the pumping stroke fluid will be pumped out. This action can continue to take place until the liquid level in the pump down tube 144 is below the portion 146 a distance such that the amount of fluid pumped out (after the vapor pocket has been changed to liquid) is equal to the amount pumped in and there will be no further net movement of fluid out of the chamber 108. Thus after a short period of dynamic weekday operation, the present unit is capable of continued operation in a pump down mode with an essentially constant no-load spring force (the damping function being unaffected) and with a definite limitation upon the amount of hydraulic fluid which can be removed from the spring chamber 108. Now, when the weekend static load is added, the sprung mass will move down to its static 3–7 position so that upon commencement of dynamic operation, within a few operating cycles (approximately seven) sufficient fluid will be pumped into the chamber 108 to replenish the relatively small vapor pocket within the tube 144 and chamber 108 and establish a spring force therein, which spring force is rapidly increased until the designed 5—5 level is reached.

It thus will be seen that the objects of this invention have been fully and effectively accomplished. It will be realized, however, that the foregoing preferred specific embodiment has been shown and described for the purpose of illustrating the functional and structural principles of this invention and is subject to change without departure from such principles. Therefore, this invention includes all modifications encompassed within the spirit and scope of the following claims.

What is claimed is:

1. A self-leveling combined shock absorber and fluid spring assist unit adapted to be mounted in place of a conventional shock absorber between the sprung and unsprung masses of a vehicle having a conventional suspension system, said unit comprising a pair of tubular structures mounted for longitudinal movement with respect to each other in contracting and extending telescopic relation, means on the outer ends of said tubular structures for effecting the connection thereof between the sprung and unsprung masses of the vehicle so that said tubular structures move in contracting telescopic relation in response to the movement of said masses toward one another and said tubular structures move in extending telescopic relation in response to the movement of said masses in a direction away from each other, one of said tubular structures including a cylinder, the other of said tubular structures including piston means slidably mounted within said cylinder and a piston rod member connected with said piston means and extending outwardly of said cylinder through one end thereof, said piston means dividing said cylinder into a rebound damping chamber adjacent said one end of said cylinder which increases and decreases in volume in response to the movement of said tubular structures respectively in contracting and extending relation and a compression damping chamber adjacent the opposite end thereof which decreases and increases in volume in response to the movement of said tubular structures respectively in contracting and extending relation, means within one of said tubular structures defining a supply damping chamber, said tubular structures having a quantity of hydraulic fluid therein including a portion within said supply damping chamber and portions filling said compression and rebound damping chambers, hydraulic fluid flow control means for controlling the flow of said hydraulic fluid in response to the movement of said tubular structures in contracting telescopic relation outwardly of said compression damping chamber and into said rebound damping chamber and said supply damping chamber and for controlling the flow of said hydraulic fluid in response to the movement of said tubular structures in extending telescopic relation outwardly of said rebound damping chamber and said supply damping chamber into said compression damping chamber so as to dampen the movement of said tubular structures in both contracting and extending telescopic relation, said tubular structures including means separate from said damping chambers defining a load bearing spring chamber including an elongated displacement member separate from said piston rod member of a diameter size less than the diameter size of said piston rod and annular wall means disposed in telescopic sliding relation to said displacement member so that said load bearing spring chamber is decreased in volume by said displacement member in response to the movement of said tubular structures in contracting telescopic relation and is increased in volume by said displacement member in response to the movement of said tubular structures in extending telescopic relation, fluid means within said load bearing spring chamber including a portion of said hydraulic fluid the pressure of which increases in response to the movement of said tubular structures in contracting telescopic relation and decreases in response to the movement of said tubular structures in extending telescopic relation so as to provide a load bearing force acting on the effective area of said displacement member which varies in accordance with the relative position of movement of said tubular structures and the amount of hydraulic fluid within said load bearing spring chamber, and position sensitive means within said tubular structures operable in response to the telescopic movements thereof for effecting movement of hydraulic fluid contained within at least one of said damping chambers into said load bearing spring chamber and for effecting movement of hydraulic fluid out of said load bearing spring chamber into at least one of said damping chambers so as to maintain a variable amount of hydraulic fluid within said load bearing spring chamber sufficient to provide a load bearing force when said tubular structures are in a generally centrally located predetermined relative telescopic position which vaires substantially in accordance with the static load carried by the sprung mass of the vehicle.

2. An assist unit as defined in claim 1 wherein said load bearing spring chamber defining means includes the interior periphery of said piston rod member.

3. An assist unit as defined in claim 1 wherein said fluid means within said load bearing spring chamber consists entirely of a portion of said hydraulic fluid.

4. An assist unit as defined in claim 1 wherein said position sensitive means includes positive displacement pump means defining pump chamber means which increases in volume in response to the movement of said tubular structures in one of said telescopic relations and decreases in volume in response to the movement of said tubular structures in the other of said telescopic relations, means for communicating a portion of said hydraulic fluid other than the portion within said load bearing spring chamber with said pump chamber means during the movement of said tubular structures in said one telescopic relation so as to fill said pump chamber means with hydraulic fluid at pressure conditions which are different from the pressure conditions within said load bearing spring chamber and free of abrupt changes throughout said movement of said tubular structures within at least a substantial extent of said movement between the extreme positions of movement and for communicating said pump chamber means with said load bearing spring chamber during the movement of said tubular structures in said other telescopic relation so as to displace hydraulic fluid from said pump chamber means into said load bearing spring chamber at pressure conditions which are generally equal to the pressure conditions within said load bearing spring chamber and free of abrupt changes throughout said movement of said tubular structures within at least a substantial extent of said movement between the extreme positions of movement.

5. An assist unit as defined in claim 4 wherein said displacement member includes surface means forming a part of said pump means which defines a portion of said pump chamber means.

6. An assist unit as defined in claim 4 wherein said position sensitive means further includes second pump means defining second pump chamber means which increases in volume in response to the movement of said tubular structures in one of said telescopic relations only during such movement beyond said predetermined position and decreases in volume in response to the movement of said tubular structures in the other of said telescopic relations only during such movement beyond said predetermined position, means for communicating the hydraulic fluid within said load bearing spring chamber with said second pump chamber means during said movement of said tubular structures in said one telescopic relation so as to maintain said second pump chamber means supplied with hydraulic fluid and for communicating the hydraulic fluid within said second pump chamber means with a portion of said hydraulic fluid other than the portion within said load bearing spring chamber during said movement of said tubular structures in said other telescopic relation so as to displace hydraulic fluid from said second pump chamber means, said second pump means and said first mentioned pump means having different operative strokes and displacements which are interrelated so as to maintain said variable amount of hydraulic fluid within said load bearing spring chamber sufficient to provide a load bearing force when said tubular structures are in said predetermined position which varies substantially in accordance with the static load carried by the sprung mass of the vehicle.

7. An assist unit as defined in claim 6 wherein said displacement member includes first surface means forming a part of said first mentioned pump means which defines a portion of said first mentioned pump chamber means and second surface means forming a part of said second pump means which defines a portion of said second pump chamber means.

8. An assist unit as defined in claim 6 wherein said means for communicating the hydraulic fluid within said second pump chamber means with a portion of said hydraulic fluid other than the portion within said load bearing spring chamber comprises load pressure balanced valve means operable to maintain the pressure of the hydraulic fluid being displaced from said second pump chamber substantially equal to the pressure within said load bearing spring chamber to thereby insure that no abrupt changes in said load bearing force will be introduced as a result of the operation of said second pump means adjacent said predetermined position.

9. An assist unit as defined in claim 1 wherein said displacement member forms a part of said one tubular structure, and is interconnected therein by means insuring longitudinal movement of said displacement member with said one tubular structure but preventing the transmission of bending stresses thereto.

10. An assist unit as defined in claim 1 wherein said means defining said supply damping chamber comprises the exterior periphery of said cylinder, the interior periphery of a tubular member fixed in surrounding relation to said cylinder, and an annular sealing assembly interconnecting said one end of said cylinder with said tubular member and slidably sealingly engaging the exterior periphery of said piston rod member.

11. A self-leveling combined shock absorber and fluid spring assist unit adapted to be mounted in place of a conventional shock absorber between the sprung and unsprung masses of a vehicle having a conventional suspension system, said unit comprising a pair of tubular structures mounted for longitudinal movement with respect to each other in contracting and extending telescopic relation, means on the outer ends of said tubular structures for effecting the connection thereof between the sprung and unsprung masses of the vehicle so that said tubular structures move in contracting telescopic relation in response to the movement of said masses toward one another and said tubular structures move in extending telescopic relation in response to the movement of said masses in a direction away from each other, one of said tubular structures including a cylinder, the other of said tubular structures including piston means slidably mounted within said cylinder and a piston rod member connected with said piston means and extending outwardly of said cylinder through one end thereof, said piston means dividing said cylinder into a rebound damping chamber adjacent said one end of said cylinder which increases and decreases in volume in response to the movement of said tubular structures respectively in contracting and extending relation and a compression damping chamber adjacent the opposite end thereof which decreases and increases in volume in response to the movement of said tubular structures respectively in contracting and extending relation, said one tubular structure including a tubular member surrounding said cylinder, an annular sealing assembly interconnecting said one end of said cylinder with said tubular member and slidably sealingly engaging the exterior periphery of said piton rod member, said tubulr member and annular sealing assembly defining with said cylinder an annular supply damping chamber, said tubular structures having a quantity of hydraulic fluid therein including a portion within said supply damping chamber and portions filling said compression and rebound damping chambers, base valve means between the opposite end of said cylinder and the adjacent end of said supply damping chamber for restricting and controlling the flow of said hydraulic fluid between said compression damping chamber and said supply damping chamber in response to the telescopic movements of said tubular structures, flow control means within said piston means for restricting and controlling the flow of said hydraulic fluid between said compression and rebound damping chambers in response to the telescopic movements of said tubular structures, an elongated displacement member carried by said other tubular structure, said piston means including annular seal means slidably engaging the exterior periphery of said displacement member, said piston rod member including interior surface means defining with said annular seal means and the adjacent portion of said piston means and with the portion of said displacement member extending through said annular seal means a load bearing spring chamber which is decreased in volume by said displacement member in response to the movement of said tubular structures in contracting telescopic relation and is increased in volume by said displacement member in response to the movement of said tubular structures in extending telescopic relation, said load bearing spring chamber having a portion of said hydraulic fluid therein the pressure of which increases in response to the movement of said tubular structures in contracting telescopic relation and decreases in response to the movement of said tubular structures in extending telescopic relation so as to provide a load bearing force acting on the effective area of said displacement member which varies in accordance with the relative position of movement of said tubular structures and the amount of hydraulic fluid within said load bearing spring chamber, said displacement member including interior surface means and exterior surface means, means including said interior surface means and a cooperating first pump element forming a part of said one tubular structure defining a first pump chamber which increases in volume in response to the movement of said tubular structures in one of said telescopic relations and decreases in volume in response to the movement of said tubular structures in the other of said telescopic relations, means for communicating the hydraulic fluid within one of said damping chambers with said first pump chamber during the movement of said tubular structures in said one telescopic relation so as to maintain said first pump chamber filled with hydraulic fluid at pressure conditions which are different from the pressure conditions within said load bearing spring chamber and free of abrupt changes throughout said movement of said tubular structures within at least a substantial extent of said movement between the extreme positions of movement and for communicating said first pump chamber with said load bearing spring chamber during the movement of said tubular structures in said other telescopic relation so as to displace hydraulic fluid from said first pump chamber into said load bearing spring chamber at pressure conditions which are generally equal to the pressure conditions within said load bearing spring chamber and free of abrupt changes throughout said movement of said tubular structures within at least a substantial extent of said movement between the extreme positions of movement, means including the exterior surface means of said displacement member and a second pump element forming a part of said one tubular structure defining a second pump chamber which increases in volume in response to the movement of said tubular structures in one of said telescopic relations only during such movement beyond a generally centrally located predetermined relative telescopic position and decreases in volume in response to the movement of said tubular structures in the other of said telescopic relations only during such movement beyond said predetermined position, means for communicating the hydraulic fluid within said load bearing spring chamber with said second pump chamber during said movement of said tubular structures in said one telescopic relation so as to maintain said second pump chamber supplied with hydraulic fluid, and load pressure balanced valve means for communicating the hydraulic fluid within said second pump chamber with one of said damping chambers during said movement of said tubular structures in said other telescopic relation so as to displace hydraulic fluid from said pump chamber means at a pressure which is at all times substantially equal to the pressure within said load bearing spring chamber to thereby insure that no abrupt changes in said load bearing force will be introduced as a result of the operation of said second pump element adjacent said predetermined position, said first and second pump chambers having different operative strokes and displacements which are interrelated so as to maintain a variable amount of hydraulic fluid within said load bearing spring chamber sufficient to provide a load bearing force when said tubular structures are in said predetermined position which vary substantially in accordance with the static load carried by the sprung mass of the vehicle.

12. An assist unit as defined in claim 11 wherein said first pump element comprises a pump rod, means connecting one end of said pump rod with said piston rod member in longitudinally fixed relation and for relative angular movement with respect thereto, said pump rod having a cylindrical exterior peripheral surface and wherein said displacement member receives said pump rod therein and includes an end portion having a cylindrical exterior periphery terminating in an annular groove, a resilient member having a valve sleeve portion fixedly secured at one end with the exterior periphery of said displacement member longitudinally inwardly of said annular groove and extending longitudinally outwardly beyond the end of said displacement member and an integral sealing ring portion extending radially inwardly from the opposite end of said valve sleeve portion in sliding sealing relation to said cylindrical surface of said pump rod, an anti-extrusion washer filling the space between said sealing ring portion and the adjacent end of said displacement member, said valve sleeve portion engaging said cylindrical exterior periphery of said displacement member and having opening means extending therethrough adjacent said annular groove so as to permit flow of hydraulic fluid from said first pump chamber radially outwardly between said washer and said end of said displacement member and longitudinally between said valve sleeve portion and said cylindrical exterior periphery into said annular groove and then outwardly through said opening means into said load bearing spring chamber, the engagement of said sleeve portion with said exterior periphery of said displacement member preventing flow of fluid therebetween in the reverse direction.

13. An assist unit as defined in claim 12 wherein said pump rod includes a free end portion of short longitudinal extent having a reduced diameter dimension.

14. An assist unit as defined in claim 12 wherein said second pump means comprises a pump tube fixedly connected with said piston means and extending upwardly in closely spaced relation to the upper end of said load biasing spring chamber, said pump tube including a lower portion having a cylindrical interior peripheral surface, and wherein said second pump chamber defining means includes a second annular seal mounted adjacent said end portion of said displacement member and slidably sealingly engaging the cylindrical interior peripheral surface of said pump tube.

15. An assist unit as defined in claim 11 wherein said piston means includes a piston member and an exteriorly threaded plug member cooperatively threadedly engaged with said piston rod member and said piston member so as to rigidly secure the latter together.

16. An assist unit as defined in claim 15 wherein said plug member includes a through passage therein providing a restricted outlet communicating between said rebound damping chamber and said second pump chamber and a relatively large bore communicating between said load bearing chamber and said second pump chamber, and wherein said load pressure balanced valve means comprises a valve member having a piston portion slidably sealingly mounted within said large bore and a second portion movable into and out of closing relation with said restricted outlet, said valve member having inlet passage means extending therethrough, an annular seal carried by said valve member in a position of cooperating relation with said inlet passage means permitting flow of fluid from said load bearing spring chamber to said second pump chamber but preventing flow from said second pump chamber to said load bearing spring chamber, and spring means resiliently urging said valve member in a direction to close said restricted outlet.

17. An assist unit as defined in claim 16 wherein said plug member has an opening communicating with said load bearing spring chamber and pressure relief valve means within said opening for permitting flow of hydraulic fluid out of said load bearing spring chamber when the pressure therein reaches a predetermined maximum level.

18. An assist unit as defined in claim 11 wherein said piston means comprises a piston member and said flow control means includes a series of circumferentially spaced axially extending grooves formed in the exterior periphery of said piston member, piston ring means carried by said piston member in sliding sealing engagement with the interior periphery of said cylinder operable to permit flow past the periphery of said piston member from said compression damping chamber to said rebound damping chamber but to prevent flow past the periphery of the piston member from said rebound damping chamber to said compression damping chamber, said piston member having an interior passage communicating between said compression and rebound damping chambers and check valve means within said passage for controlling flow therethrough from said rebound damping chamber to said compression damping chamber but preventing flow therethrough from said compression damping chamber to said rebound damping chamber.

19. An assist unit as defined in claim 18 wherein said base valve means comprises a base member providing two parallel flow paths between said compression damping chamber and said supply damping chamber, a replenishing check valve within one of said paths permitting flow of hydraulic fluid from said supply damping chamber to said compression damping chamber but preventing flow from said compression damping chamber to said supply damping chamber and compression check valve means in the other of said paths controlling flow of hydraulic fluid from said compression damping chamber to said supply damping chamber but preventing flow of fluid from said supply damping chamber to said compression damping chamber.

20. An assist unit as defined in claim 19 wherein said annular sealing assembly comprises a rigid annular member of porous metal secured to said one end of said cylinder and extending radially outwardly and radially inwardly therefrom, an annular pressure seal carried by said rigid annular member in sliding sealing engagement with the exterior periphery of said piston rod member, an annular wiper seal mounted in sliding sealing relation with the exterior periphery of said piston rod member outwardly of said pressure seal, said wiper seal including inwardly diverging outer peripheral surfaces, a rigid cap element having an inner portion engaging one of said wiper seal surfaces and an outwardly extending peripheral flange engaging said rigid annular member, said tubular member engaging the outer periphery of said rigid annular member and having its end portion turned over the peripheral flange of said cap element, washer means between the other peripheral surface of said wiper seal and said rigid annular member including a spring element resiliently urging said wiper seal into engagement with said cap element, and means defining a flow passage from the space between said pressure seal and said wiper seal and said supply damping chamber.

21. An assist unit as defined in claim 20 wherein said one tubular structure includes an outer dust tube having a dimension sufficient to closely embrace said tubular member, said dust tube being fixedly connected with said piston rod member.

22. A self-leveling combined shock absorber and fluid spring assist unit adapted to be mounted in place of a conventional shock absorber between sprung and unsprung masses of a vehicle having a conventional suspension system, said unit comprising a pair of tubular structures mounted for longitudinal movement with respect to each other in contracting and extending telescopic relation, means on the outer ends of said tubular structures for connecting the same between the sprung and unsprung masses of the vehicle so that said tubular structures move in contracting telescopic relation in response to the movement of said masses toward one another and said tubular structures move in extending telescopic relation in response to the movement of said masses in a direction away from each other, said tubular structures including telescopically cooperative rigid wall means defining a rebound damping chamber which increases and decreases in volume in response to the movement of said tubular structures respectively in contracting and extending telescopic relation and a compression damping chamber which decreases and increases in volume in response to the movement of said tubular structures respectively in contracting and extending telescopic relation, said tubular structures having a quantity of hydraulic fluid therein including portions filling said compression and rebound damping chambers, hydraulic fluid flow control means for (1) permitting the flow of hydraulic fluid into said rebound damping chamber and controllably restricting the flow of said hydraulic fluid outwardly of said compression damping chamber in response to the movement of said tubular structures in contracting relation and (2) permitting the flow of hydraulic fluid into said compression damping chamber and controllably restricting the flow of hydraulic fluid outwardly of said rebound damping chamber in response to the movement of said tubular structures in extending telescopic relation so as to dampen the movement of said tubular structures in both contracting and extending telescopic relation, said tubular structures defining a load bearing spring chamber including an elongated displacement member and annular wall means disposed in telescopic sliding relation to said displacement member so as to decrease the volume of said load bearing spring chamber in response to the movement of said tubular structures in contracting telescopic relation and to increase the volume of said load bearing spring chamber in response to the movement of said tubular structures in extending telescopic relation, fluid means within said load bearing spring chamber including a portion of said hydraulic fluid the pressure of which increases in response to the movement of said tubular structures in contracting telescopic relation and decreases in response to the movement of said tubular structures in extending telescopic relation so as to provide a load bearing force acting on the effective area of said displacement member which varies in accordance with the relative position of movement of said tubular structures and the amount of hydraulic fluid within said load bearing spring chamber, said tubular structures also including positive displacement pump means defining pump chamber means which increases in volume in response to the movement of said tubular structures in one of said telescopic relations and decreases in volume in response to the movement of said tubular structures in the other of said telescopic relations, means for communicating a portion of said hydraulic fluid other than the portion within said load bearing spring chamber with said pump chamber means during the movement of said tubular structures in said one telescopic relation so as to maintain said pump chamber means filled with hydraulic fluid at pressure conditions which are different from the pressure conditions within said load bearing spring chamber and free of abrupt changes throughout said movement of said tubular structures within at least a substantial extent of said movement between the extreme positions of movment and for communicating said pump chamber means with said load bearing spring chamber during the movement of said tubular structures in said other telescopic relation so as to displace hydraulic fluid from said pump chamber means into said load bearing spring chamber at pressure conditions which are generally equal to the pressure conditions within said load bearing spring chamber and free of abrupt changes throughout said movement of said tubular structures within at least a substantial extent of said movement between the extreme positons of movement, and position sensitive means within said tubular structures operable in response to the telescopic movements thereof for effecting movement of hydraulic fluid out of said load bearing spring chamber so as to maintain a variable amount of hydraulic fluid within said load bearing spring chamber sufficient to provide a load bearing force when said tubular structures are in a generally centrally located predetermined relative telescopic position which varies substantially in accordance with the static load carried by the sprung mass of the vehicle.

23. An assist unit as defined in claim 22 wherein said displacement member includes surface means forming a part of said pump means which defines a portion of said pump chamber means.

24. An assist unit as defined in claim 22 wherein said position sensitive means further includes second pump means defining second pump chamber means which increases in volume in response to the movement of said tubular structures in one of said telescopic relations only during such movement beyond said predetermined position and decreases in volume in response to the movement of said tubular structures in the other of said telescopic relations only during such movement beyond said predetermined position, means for communicating the hydraulic fluid within said load bearing spring chamber with said second pump chamber means during said movement of said tubular structures in said one telescopic relation so as to maintain said second pump chamber means supplied with hydraulic fluid and for communicating the hydraulic fluid within said second pump chamber means with a portion of said hydraulic fluid other than the portion within said load bearing spring chamber during said movement of said tubular structures in said other telescopic relation so as to displace hydraulic fluid from said second pump chamber means, said second pump means and said first-mentioned pump means having different operative strokes and displacements which are interrelated so as to maintain said variable amount of hydraulic fluid within said load bearing spring chamber sufficient to provide a load bearing force when said tubular structures are in said predetermined position which varies substantially in accordance with the static load carried by the sprung mass of the vehicle.

25. An assist unit as defined in claim 24 wherein said displacement member includes first surface means forming a part of said first-mentioned pump means which defines a portion of said first-mentioned pump chamber means and second surface means forming a part of said second pump means which defines a portion of said second pump chamber means.

26. An assist unit as defined in claim 24 wherein said means for communicating the hydraulic fluid within said second pump chamber means with a portion of said hydraulic fluid other than the portion within said load bearing spring chamber comprises load pressure balanced valve means operable to maintain the pressure of the hydraluic fluid being displaced from said second pump chamber substantially equal to the pressure within said load bearing spring chamber to thereby insure that no abrupt changes in said load bearing force will be introduced as a result of the operation of said second pump means adjacent said predetermined position.

27. A self-leveling combined shock absorber and fluid spring unit comprising a pair of tubular structures mounted for longitudinal movement with respect to each other in contracting and extending telescopic relation, means on the outer ends of said tubular structures for connecting the same between the sprung and unsprung masses of a vehicle or the like so that said tubular structures move in contracting telescopic relation in response to the movement of said masses toward one another and said tubular structures move in extending telescopic relation in response to the movement of said masses in a direction away from each other, said tubular structures including means defining a load bearing spring chamber including an elongated displacement member and an annular wall means disposed in telescopic sliding relation to said displacement member so as to decrease the volume of said load bearing spring chamber in response to the movement of said tubular structures in contracting telescopic relation and to increase the volume of said load bearing spring chamber in response to the movement of said tubular structures in extending telescopic relation, said tubular structures having a quantity of hydraulic fluid therein, fluid means within said load bearing spring chamber including a portion of said hydraulic fluid the pressure of which increases in response to the movement of said tubular structures in contracting telescopic relation and decreases in response to the movement of said tubular structures in extending telescopic relation so as to provide a load bearing force acting on the effective area of said displacement member which varies in accordance with the relative position of movement of said tubular structures and the amount of hydraulic fluid within said load bearing spring chamber, hydraulic fluid flow control means for controllably restricting the flow of a portion of said hydraulic fluid occurring in response to the movement of said tubular structures in contracting relation and for controllably restricting the flow of another portion of said hydraulic fluid occurring in response to the movement of said tubular structures in extending relation so as to dampen the movement of said tubular structures in both contracting and extending telescopic relation, said tubular structures including first pump means defining first pump chamber means which increases in volume in response to the movement of said tubular structures in one of said telescopic relations and decreases in volume in response to the movement of said tubular structures in the other of said telescopic relations, means for communicating a portion of said hydraulic fluid other than the portion within said load bearing spring chamber with said first pump chamber means during the movement of said tubular structures in said one telescopic relation so as to maintain said first pump chamber means filled with hydraulic fluid at pressure conditions which are different from the pressure conditions within said load bearing spring chamber and free of abrupt changes throughout said movement of said tubular structures within at least a substantial extent of said movement between the extreme positions of movement and for communicating said first pump chamber means with said load bearing spring chamber during the movement of said tubular structures in said other telescopic relation so as to displace hydraulic fluid from said first pump chamber means into said load bearing spring chamber at pressure conditions which are generally equal to the pressure conditions within said load bearing spring chamber and free of abrupt changes throughout said movement of said tubular structures within at least a substantial extent of said movement between the extreme positions of movement, said tubular structures also including second pump means defining second pump chamber means which increases in volume in response to the movement of said tubular structures in one of said telescopic relations only during such movement beyond a centrally located predetermined relative telescopic position and decreases in volume in response to the movement of said tubular structures in the other of said telescopic relations only during such movement beyond said predetermined position, means for communicating the hydraulic fluid within said load bearing chamber with said second pump chamber means during said movement of said tubular structures in said one telescopic relation so as to maintain said second pump chamber means supplied with hydraulic fluid and for communicating the hydraulic fluid within said second pump chamber means with a portion of said hydraulic fluid other than the portion within said load bearing spring chamber during said movement of said tubular structures in said other telescopic relation so as to displace hydraulic fluid from said second pump chamber means, said first and second pump means having different operative strokes and displacements which are interrelated so as to maintain a variable amount of hydraulic fluid within said load bearing spring chamber sufficient to provide a load bearing force when said tubular structures are in said predetermined position which varies substantially in accordance with the static load carried by the sprung mass of the vehicle.

28. A unit as defined in claim 27 wherein said displacement member includes first surface means forming a part of first pump means which defines a portion of said first pump chamber means and second surface means forming a part of said second pump means which defines a portion of said second pump chamber means.

29. A unit as defined in claim 27 wherein said means for communicating the hydraulic fluid within said second pump chamber means with a portion of said hydraulic fluid other than the portion within said load bearing spring chamber comprises load pressure balanced valve means operable to maintain the pressure of the hydraulic fluid being displaced from said second pump chamber substantially equal to the pressure within said load bearing spring chamber to thereby insure that no abrupt changes in said load bearing force will be introduced as a result of the operation of said second pump means adjacent said predetermined position.

30. A self-leveling combined shock absorber and fluid spring unit comprising a pair of tubular structures mounted for longitudinal movement with respect to each other in contracting and extending telescopic relation, means on the outer ends of said tubular structures for connecting the same between the sprung and unsprung masses of a vehicle or the like so that said tubular structures move in contracting telescopic relation in response to the movement of said masses toward one another and said tubular structures move in extending telescopic relation in response to the movement of said masses in a direction away from each other, said tubular structures including means defining a load bearing spring chamber including an elongated displacement member and an annular wall means disposed in telescopic sliding relation to said displacement member so as to decrease the volume of said load bearing spring chamber in response to the movement of said tubular structures in contracting telescopic relation and to increase the volume of said load bearing spring chamber in response to the movement of said tubular structures in extending telescopic relation, said tubular structures having a quantity of hydraulic fluid therein, fluid means within said load bearing spring chamber including a portion of said hydraulic fluid the pressure of which increases in response to the movement of said tubular structures in contracting telescopic relation and decreases in response to the movement of said tubular structures in extending telescopic relation so as to provide a load bearing force acting on the effective area of said displacement member which varies in accordance with the relative position of movement of said tubular structures and the amount of hydraulic fluid within said load bearing spring chamber, hydraulic fluid flow control means for controllably restricting the flow of a portion of said hydraulic fluid occurring in response to the movement of said tubular structures in contracting relation and for controllably restricting the flow of another portion of said hydraulic fluid occurring in response to the movement of said tubular structures in extending relation so as to dampen the movement of said tubular structures in both contracting and extending telescopic relation, and position sensitive means within said tubular structures operable in response to the telescopic movements thereof for effecting movement of hydraulic fluid into and out of said load bearing spring chamber so as to maintain a variable amount of hydraulic fluid within said load bearing spring chamber sufficient to provide a load bearing force when said tubular structures are in a generally centrally located predetermined relative telescopic position which varies substantially in accordance with the static load carried by the sprung mass of the vehicle, said position sensitive means including pump means defining pump chamber means which increases in volume in response to the movement of said tubular structures in one of said telescopic relations only during such movement beyond said predetermined position and decreases in volume in response to the movement of said tubular structures in the other of said telescopic relations only during such movement beyond said predetermined position, means for communicating the hydraulic fluid within said load bearing spring chamber with said pump chamber means during said movement of said tubular structures in said one telescopic relation so as to maintain said pump chamber means filled with hydraulic fluid, and load pressure balanced valve means for communicating the hydraulic fluid within said pump chamber means with a portion of said hydraulic fluid other than the portion within said load bearing spring chamber during said movement of said tubular structures in said other telescopic relation so as to displace hydraulic fluid from said pump chamber means at a pressure which is at all times substantially equal to the pressure within said load bearing spring chamber to thereby insure that no abrupt changes in said load bearing force will be introduced as a result of the operation of said pump means adjacent said predetermined position.

31. A self-leveling combined shock absorber and fluid spring unit comrising a pair of tubular structures mounted for longitudinal movement with respect to each other in contracting and extending telescopic relation, means on the outer ends of said tubular structures for connecting the same between the sprung and unsprung masses of a vehicle or the like so that said tubular structures move in contracting telescopic relation in response to the movement of said masses toward one another and said tubular structures move in extending telescopic relation in response to the movement of said masses in a direction away from each other, said tubular structures including means defining a load bearing spring chamber including an elongated displacement member and annular wall means disposed in telescopic sliding relation to said displacement member so as to decrease the volume of said load bearing spring chamber in response to the movement of said tubular structures in contracting telescopic relation and to increase the volume of said load bearing spring chamber in response to the movement of said tubular structures in extending telescopic relation, said tubular structures having a quantity of hydraulic fluid therein, fluid means within said load bearing spring chamber including a portion of said hydraulic fluid the pressure of which increases in response to the movement of said tubular structures in contracting telescopic relation and decreases in response to the movement of said tubular structures in extending telescopic relation so as to provide a load bearing force acting on the effective area of said displacement member which varies in accordance with the relative position of movement of said tubular structures and the amount of hydraulic fluid within said load bearing spring chamber, hydraulic fluid flow control means for controllably restricting the flow of a portion of said hydraulic fluid occurring in response to the movement of said tubular structures in contracting relation and for controllably restricting the flow of another portion of said hydraulic fluid occurring in response to the movement of said tubular structures in extending relation so as to dampen the movement of said tubular structures in both contracting and extending telescopic relation, and position sensitive means within said tubular structures operable in response to the telescopic movements thereof for effecting movement of hydraulic fluid into and out of said load bearing spring chamber so as to maintain a variable amount of hydraulic fluid within said load spring chamber sufficient to provide a load bearing force when said tubular structures are in a generally centrally located predetermined relative telescopic position which varies substantially in accordance with the static load carried by the sprung mass of the vehicle, said position sensitive means including means defining a pump chamber and movable means operable in response to the movement of said tubular structures in one of said telescopic relations for introducing a portion of said hydraulic fluid into said pump chamber and in response to the movement of said tubular structures in the other of said telescopic relations for discharging a portion of said hydraulic fluid from said pump chamber into said load bearing spring chamber, said movable means including a rigid tubular wall portion having an end surface, a cylindrical exterior surface extending inwardly from said end surface and terminating in an annular groove and an interior surface extending inwardly of said end surface in communication with the hydraulic fluid within said pump chamber, a resilient member having a valve sleeve portion fixedly secured at one end with respect to said tubular wall portion and extending therefrom beyond said end surface in engagement with said cylindrical exterior surface and in surrounding relation to said annular groove and an integral sealing portion extending radially inwardly from the opposite end thereof, the exterior of said resilient member being in communication with the hydraluic fluid under pressure within said load bearing spring chamber, said sleeve portion having opening means therein adjacent said annular groove communicating the latter with the hydraulic fluid in said load bearing spring chamber a rigid member engaged between said sealing portion and said end surface so as to physically resist inward extrusion of said resilient member by the hydraulic fluid pressure acting on the exterior thereof, said rigid member providing a surface area extending inwardly of said end surface in communication with the hydraulic fluid within said pump chamber against which the latter may act when under a pressure greater than the pressure of the hydraulic fluid in said load bearing spring chamber to move said rigid member away from said end surface against the opposing resilient force of said resilient member and the fluid pressure force acting on the exterior thereof so as to permit flow of hydraulic fluid from said pump chamber radially outwardly between said rigid member and said end surface and longitudinally between said valve sleeve portion and said cylindrical exterior surface into said annular groove, the engagement of said valve sleeve portion with said cylindrical exterior surface preventing flow of hydraulic fluid from the annular groove toward said end surface when the pressure of the hydraulic fluid within said pump chamber is less than the pressure of the hydraulic fluid within said load bearing spring chamber.

32. A unit as defined in claim 31 wherein said movable means includes a pump rod extending into said pump chamber through the interior of said tubular wall portion, said pump rod having a cylindrical exterior surface slidably sealingly engaged by the sealing portion of said resilient member and by said rigid member.

* * * * *